United States Patent

Gutowski

[15] 3,674,160
[45] July 4, 1972

[54] APPARATUS FOR TRANSFERRING CAN LIDS THROUGH A PARTITION SUBJECT TO A PRESSURE DIFFERENTIAL

[72] Inventor: Chester L. Gutowski, Pittsburgh, Pa.
[73] Assignee: H. J. Heinz Company, Pittsburgh, Pa.
[22] Filed: April 8, 1971
[21] Appl. No.: 132,509

[52] U.S. Cl..............................214/17 B, 53/18, 198/160, 198/173, 198/176, 214/6 D, 214/8.5 G, 214/17 CC, 221/10, 221/175, 221/236, 221/253, 221/277
[51] Int. Cl.......................................................B65g 37/00
[58] Field of Search..............214/17 B, 17 CC; 221/10, 175, 221/236, 253, 277; 198/160, 173, 176

[56] References Cited

UNITED STATES PATENTS 2,889,073  6/1959  Nogle......................................221/10
3,260,383  7/1966  Fitzgerald............................214/17 B Primary Examiner—Robert G. Sheridan
Attorney—Parmelee, Utzler & Welsh

[57] ABSTRACT

In a canning method where cans are filled with a product and a lid sealed thereto in an enclosure in which the pressure inside the enclosure is different from pressure outside, a mechanism is provided for feeding can lids one at a time from a magazine outside the enclosure to the magazine of a can lid-applying machine inside the enclosure wherein an endless chain removes the lids from the bottom of a magazine outside the holder, carries them around a looped guide, one after another, and drops them alternately into one of two pockets in an oscillating pressure lock, one of which pockets is open only at the top to receive a can lid when the other has moved to a position where it is open only at the bottom to discharge a lid into a gravity chute that passes through the enclosure wall to the magazine of the can lid-applying machine inside the enclosure. The trap then oscillates to open the now-empty pocket at the top to receive a lid and close the other pocket at the top and open it at the bottom to discharge the lid which it received. The lid-feeding mechanism is driven from the can lid-applying machine inside the enclosure through a shaft that passes to the outside, with a clutch outside that feeds the lids only as required by the machine, and the oscillating pressure lock is synchronized with the operation of the endless chain.

13 Claims, 7 Drawing Figures

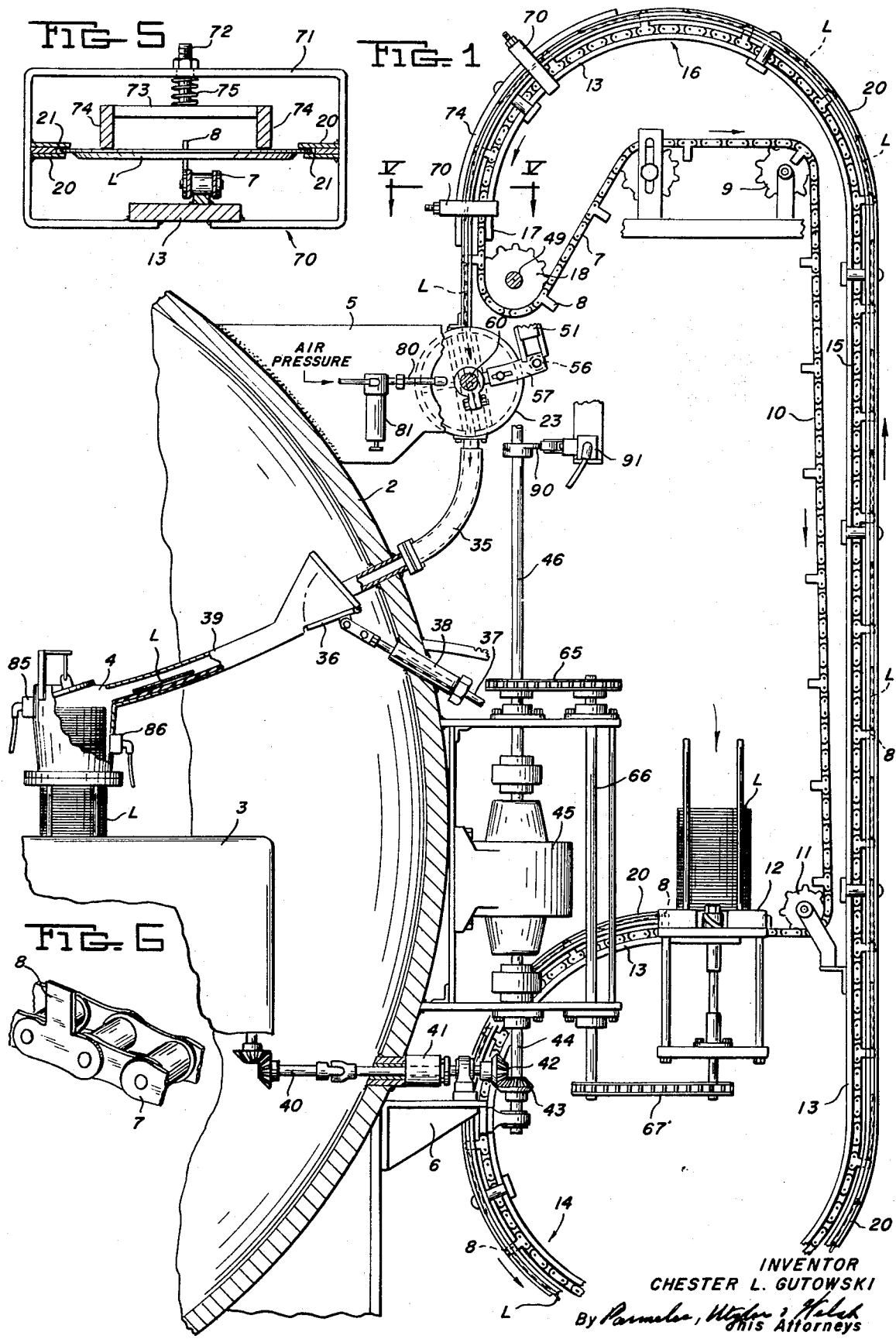

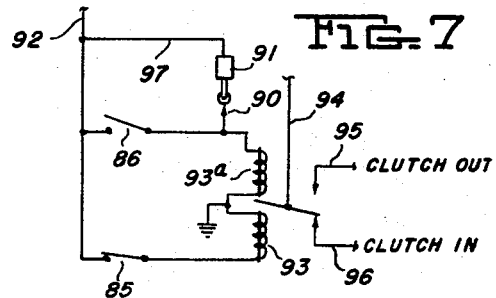
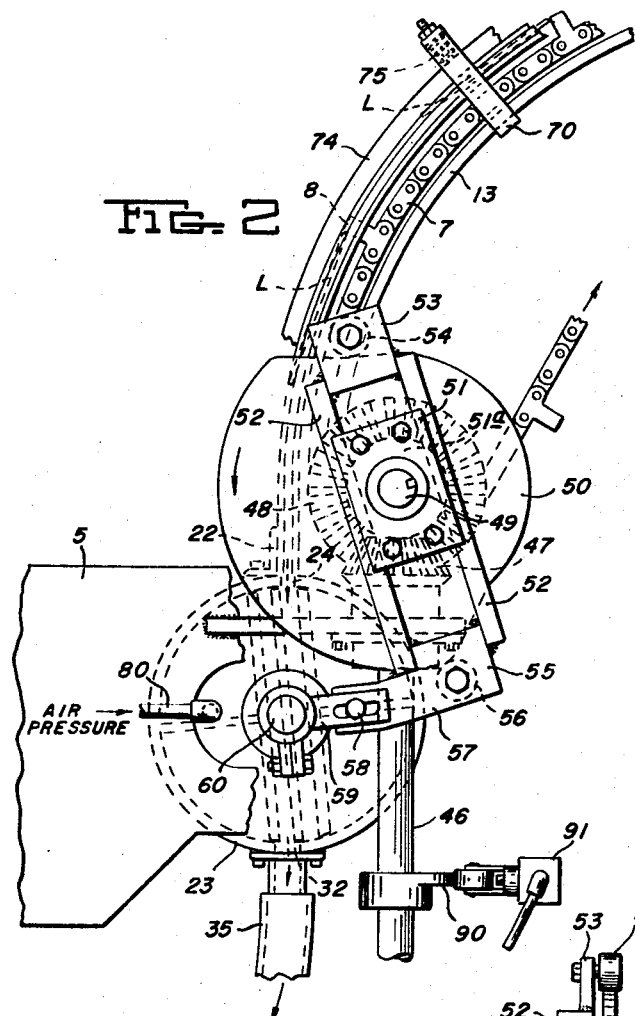
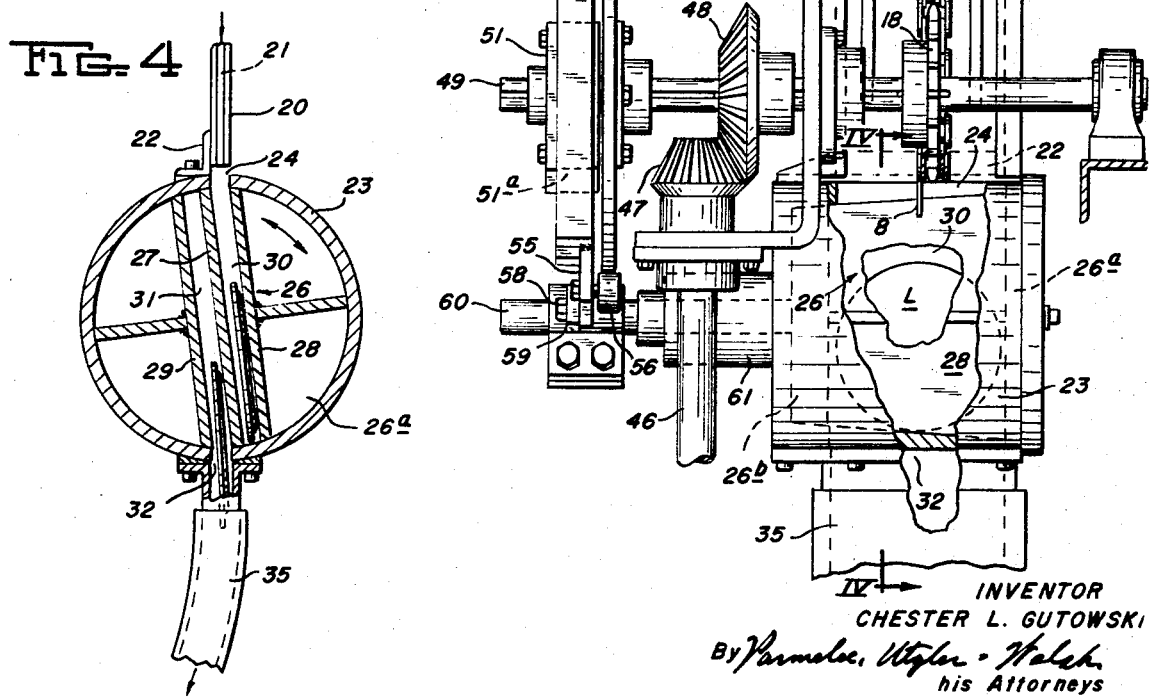
INVENTOR
CHESTER L. GUTOWSKI
By Parmelee, Utzler + Welsh
his Attorneys

APPARATUS FOR TRANSFERRING CAN LIDS THROUGH A PARTITION SUBJECT TO A PRESSURE DIFFERENTIAL

This invention relates to the art of aseptically canning a product in an enclosure where there is a pressure difference between the can-filling and closing apparatus and the atmosphere, and is for a means for supplying lids to the container-closing apparatus from the exterior to the interior of the enclosure.

In the application which I have filed jointly with Richard A. Smith, Ser. No. 33,204, filed Apr. 30, 1970 and assigned to my present assignee, there is disclosed a method of and apparatus for passing containers one at a time from the atmosphere through a rotating pressure lock into a filling line where the containers are filled with a hot sterile product in an atmosphere of air under pressure, typically about 32 lbs. per square inch. The filled cans are then delivered to a sealer in the enclosure which applies lids to the containers, and then the containers are delivered to a steam chamber, also under pressure, through which they roll for a length of time to insure sterilization of the containers and the product with which they are filled, after which the cans pass through another revolving pressure lock to the atmosphere.

The machine for applying the lids to the containers is a conventional turret type machine with a magazine to hold a stack of lids, and the lids are removed one at a time from the bottom of this magazine and applied to successive cans as the operation proceeds. There is a problem, however, in keeping the lid-applying and sealing machine supplied with lids for sustained periods of operation. To have an operator in the enclosure to replenish the lids in the magazine as they are required would necessitate lower pressures to be used in the enclosure and elaborate compression and decompression chambers would be needed and there would be an ever present possibility of injury to an operator. Neither is it practical to stop the operation when a new supply of lids is required, then decompress the enclosure and then enter it to place a new supply of lids in the magazine of the lid-applying and closing machine, thereafter sealing the enclosure and restoring the pressure.

The present invention provides in combination with such an apparatus, or in any apparatus where lids are required to be transferred from one pressure environment to another, a simple apparatus for effecting such transfer in accordance with the requirements of the lid-applying and sealing machine. Since the invention is especially applicable to the application of metal lids to metal containers, such as so-called "tin cans," it will be hereinafter described for such purpose without, however, excluding the supplying of lids to other containers wherever applicable.

In general, the apparatus comprises a magazine for holding a stack of lids that is located in the ambient atmosphere close to the enclosure which contains the lid-applying and sealing machine. Normally the enclosure will be one in which there is an atmosphere of air under pressure, but it could be another gas or vapor, or even have a sub-atmospheric pressure therein. A conveyor chain moving under this external magazine removes the lids, one at a time from the bottom of the magazine and moves them in spaced succession around a looped guide track to a higher elevation. From the end of the looped track the lids are delivered to a pressure lock or trap which drops them in turn into a chute that passes through the enclosure wall. The lids slide from this chute into a magazine forming part of a conventional turret type can lid-applying and sealing machine within the enclosure. This pressure lock comprises a unit that resembles generally a familiar type of plug valve, having a casing in the top of which is an elongated slot into which the can lids drop. There is a core or body of generally circular section within the casing having two parallel lid-receiving pockets passing therethrough, one being at each side of a plane which is on the diameter of the circular section. The casing has a second or lower slot 180° removed from the first, the arrangement being such that when the circular body is oscillated through an arc of a few degrees, one pocket will register with the first slot in the top of the casing and the bottom of the other pocket will register with the second slot, so that a can lid may drop into one pocket as one falls out of the other, thus alternately transferring the lids through one pocket and then the other while preventing the free flow of air or gas through the transfer device.

The chain and transfer device are geared together to operate in synchronism, and both are preferably driven from the lid-applying and sealing machine inside the enclosure. This drive preferably includes a magnetic clutch controlled by proximity switches on the magazine of the lid-applying and sealing machine in such manner that there will be a stack of lids in the magazine of said machine at all times, but the feeding of lids will stop when a predetermined number of lids has accumulated in said magazine.

In the drawings showing a preferred embodiment of the invention:

FIG. 1 is an assembly view showing a fragment of the enclosure in section with a portion of the can lid-applying machine being schematically indicated, and with the can lid-feeding and transfer mechanism being shown partly in side elevation and partly in vertical section, part of the pressure lock oscillating mechanism being omitted;

FIG. 2 is a fragmentary side elevation on a larger scale than FIG. 1 showing the pressure lock lid feeder with its oscillating mechanism;

FIG. 3 is an elevation of the mechanism shown in FIG. 2 at right angles to FIG. 2;

FIG. 4 is a fragmentary transverse vertical section through the pressure lock transfer mechanism in substantially the plane of line IV—IV of FIG. 3;

FIG. 5 is a fragmentary horizontal section in the plane of line V—V of FIG. 1, but on a larger scale;

FIG. 6 is a fragmentary perspective view of a section of the endless chain; and

FIG. 7 is a simplified schematic wiring diagram. Referring first to FIG. 1, 2 designates the wall of a generally cylindrical pressure chamber such as that disclosed in my said joint application with Richard A. Smith. In this chamber there is a conventional turret type can lid-applying and sealing machine, a fragment of which is schematically indicated at 3. It has a fixed can lid-holding magazine 4 of usual construction under which the cans on the turret move with a lid being dropped from the magazine onto each can in turn, this arrangement being well known in the art and forming no part per se of the present invention. As previously indicated, the interior of the enclosure 2 is at a pressure other than atmospheric pressure. In said joint application it is typically filled with air at about 32 p.s.i.

On the outside of the pressure vessel or enclosure 2 there are two fixed brackets, 5 and 6, which support the external can lid-supplying mechanism. This mechanism comprises an endless sprocket chain 7 with lugs 8 projecting therefrom at spaced intervals (see FIG. 6). Starting with the upper right-hand guide sprocket 9 in FIG. 1, this chain has a descending vertical reach 10 that passes around a lower sprocket 11, which guides it laterally under a lid-feeding magazine 12. From the left side of the bottom of the magazine the chain is guided by a track strip 13, shown in section in FIG. 5, around a somewhat circular bottom loop 14, then up a vertical reach 15 around an upper substantially semi-circular loop 16 to the terminal 17 of the track 13. At this terminal the chain passes around sprocket wheel 18 back to sprocket wheel 9. The track strip 13 therefore defines an incomplete elipse that is open along one side. It begins with a lower end extending laterally from the magazine 12.

There are two parallel edge guides 20, one at one side of the track strip, and one at the other, that are spaced a uniform distance out from the track strip and the chain at a distance where the lugs 8 extend midway into the space between the edge guides 20. As best seen in FIG. 5, the edge guides each have a groove at 21 in their confronting edges, the arrangement being such that the can lids L will span the distance between these edge guides with only diametrically opposite margins received in the grooves 21. With this construction the lid-feeding magazine 12 will normally drop a can lid from the magazine to a level where a lug 8 on the chain will push the lid ahead of it, entering the margins of the lid in the channels or grooves of the edge guides and push the lid ahead of it to the discharge end portion of the edge guides, as hereinafter more fully described.

The edge guide strips 20 extend vertically a slight distance down below the end 17 of the track 13 and only slightly below the level of the chain sprocket 18. As best seen in FIG. 4, the discharge ends of the edge guide are secured by an angle member 22 to the top of a cylindrical casing 23 of the pressure lock which is carried by the upper bracket 5 on the exterior of the enclosure.

There is an upper slot 24 in the top of the casing 23 and the ends of the edge guides are so positioned that a can lid sliding down the edge guides will enter this slot. There is a core or body 26 having a working fit inside this casing, the casing having an interior wall that is generally of a truncated cone shape, and the core is tapered from a larger end disk 26a to a smaller end disk 26b, the intervening part of the body or core being comprised principally of three spaced parallel walls, the middle one 27 being in the plane of a diameter of the circular body and the other two, 28 and 29, being at opposite sides of 27, these three plates forming two longitudinally extending parallel slots or pockets 30 and 31 that pass entirely through the core, one at each side of the diameter. In the bottom of the cylindrical casing there is a slot 32. The arrangement is such that when pocket 30 registers with slot 24 in the top of the casing so that it may receive a can lid moving down from the edge guides while it is closed at the bottom. At the same time pocket 31 will register with the bottom slot 32 in the casing so that a lid that has previously been deposited in it can drop through this bottom slot, but pocket 31 will then be closed at the top. By oscillating the core 26 through a few degrees of arc, this condition will be reversed, and pocket 31 will register with the top casing slot 24 and pocket 30 will register with lower casing slot 32.

There is a chute 35 sealed to the bottom of the casing below the slot 32 so that can lids falling out this slot slide down the chute which passes through the wall 2 of the enclosure. Inside the enclosure there is an enlarged portion where a gate 36 which normally forms the bottom of the chute may be operated from the exterior of the enclosure to close the chute if, for any reason, the lid transfer lock comprising the casing and body 26 must be removed while there is pressure in the enclosure. Beyond the gate 36 the chute has a section 39 that terminates at the lid-receiving and holding magazine 4 of the can lid-applying and sealing machine 3.

The general arrangement therefore provides for the sprocket chain taking the lids one at a time from the exterior lid-holding magazine 12, moving them around the guide and dropping them through the slot 24 in the top of the cylindrical casing and the body or core 26, which constitutes a pressure lock is oscillated to alternately receive a lid in one of the pockets 31 or 32 and then the other. This requires proper synchronization between the operation of the exterior can-feeding magazine, the chain, and the oscillation of the pressure lock or core 26. Moreover, there may be times when one or more cans do not feed from the interior magazine 4 into the machine 3 so that too many lids could accumulate in the magazine 4. On the other hand it is desirable that there be lids in the magazine to continue operation should there be a temporary interruption of the lid feeding. In order to corelate the feeding of the lids within limits to the requirement of the cap-applying and sealing machine, the feeding of the lids is operated by or in conjunction with the lid-applying and sealing machine. This is schematically indicated in FIG. 1 where a shaft 40 is gear-driven from the lid-applying and sealing machine. This shaft passes through a gland or packing 41 and a bevel gear 42 on its outer end meshes with a pinion 43 on a vertical shaft 44, which is the drive shaft for a magnetically operated clutch 45 of any known or preferred construction. This clutch selectively drives vertical shaft 46.

As shown in FIG. 3, shaft 46 has a bevel gear 47 at its upper end and this gear meshes with and drives a bevel gear 48 fixed on a horizontal shaft 49 on which the sprocket wheel 18 is fixed to drive the endless sprocket chain 7. The shaft 49 also has a cam disk 50 (see FIG. 2) fixed thereon for rotation with the shaft 49. There is a plate 51 with a hub that is not keyed to shaft 49 mounted on the end of shaft 49, and there is a block 51a bolted to the rear face of this plate. There are parallel bars 52 slidably fitted against the sides of this block, one at each side of the shaft. There is an end-piece 53 welded to the upper end of these bars on which is a cam-follower comprising a roller 54 that bears on the periphery of the cam disk 50. At the lower end of these bars is a similar end-piece 55 with a similar roller cam-follower 56 thereon that also bears on the periphery of the cam disk 50. This end-piece also has a rigid arm 57 thereon. This arm has a pin 58 thereon which is received in a slot in a crank-arm 59 that is fixed on a shaft 60 that extends horizontally from one end of the pressure lock core or body 26 through a packed bearing 61 at one end of casing 23. When the lower cam follower rides onto the high side of cam 50, the upper cam follower rides to the low side, moving the arm 57 down to oscillate the core 26 a few degrees in one direction, and of course when the high side of the cam 50 rides under the upper cam follower to raise the arm 57, it oscillates the core 26 in the opposite direction. Each rotation of the cam therefore will allow two can lids to pass through it. Consequently the chain must remove two can lids from the outside magazine 12 and bring two lids to the terminal of the lid guide arrangement for each rotation of cam 50.

To accomplish this the gear ratio is such that 2 revolutions of shaft 46 turns the cam on shaft 49, 1 revolution. There is a sprocket chain drive 65 from shaft 46 to a parallel vertical shaft 66 and a second sprocket chain drive 67 at the lower end of shaft 66 drives the lid feeder mechanism at the bottom of the magazine 12. The sprocket chain gearing is such that one lid is delivered from magazine 12 for each revolution of shaft 46.

Throughout most of the travel of the lids around the track comprising the chain guide and edge guides, the can lids are being pushed by lugs 8 on the chain 7. However in the down side of the top loop, as the can approaches the lid transfer pressure lock, they tend, or some of them tend, to move by gravity ahead of the lugs which are pushing them and disturb the timing of the lid feed to the upper slot 24 in the casing 23. To prevent this there is a friction means, best seen in FIG. 5, for restraining the lids against free fall. This means as here shown comprises two spaced frames 70 secured around the track so that there is a span 71 of each frame extending over the track. A post 72 is provided on each of the spans 71, the post passing through the span and having a spreader bar 73 at its inner end. The spreader bar of the two posts carry two parallel bars 74 that are yieldably pressed against the can lids traveling under them by springs 75 positioned around the respective posts 72 with sufficient friction to prevent the lids from moving by gravity ahead of the lugs 8 which are pushing them. Only after a lid has been moved down beyond the lower ends of the friction strips or bars 74, a distance of less than one lid diameter, and are being entered into the pressure lock may they drop freely, and at this level the sprocket chain is diverging from the lid guides where they can no longer engage the lids. In other words, the guide, sprocket chain and pressure lock are co-related to assure a positive feed of the lids until the last bit of travel of the lids.

To equalize fluid pressure around the oscillating pressure lock core there is a pipe 80 that leads from the interior of the enclosure 2 to one end of the pressure lock casing 23. A regulator in this pipe is indicated at 81, and it may also function as a cut-off valve. With pressure fluid in the air lock casing there is an effective balance pressure around the core offsetting the pressure in the pockets of the core that might otherwise prevent the core from turning freely and easily.

Finally, there is an upper proximity switch 85 on the lid-holding magazine 4 on the lid-applying and container-sealing machine 3 and there is a second proximity switch 86 on the same magazine. Switch 86 energizes the magnetically operated clutch 45 when the level of lids in the magazine 4 drops below the level of this switch to drive the external lid-feeding mechanism, and the upper proximity switch 85 effects the release of the clutch to stop the feeding of lids to the magazine when the level of lids in the magazine exceeds a height determined by the said upper switch. Normally the lids will be supplied to the magazine 4 at the same rate at which they are used and the level will stay between the two proximity switches.

When proximity switch 85 closes because of the high level of lids in the magazine 4, it closes a circuit to effect the release or disengagement of magnetically operated clutch 45 and when the level of lids in the magazine 4 drops below proximity switch 86 in a circuit is closed to effect engagement of the clutch with shaft 46 to drive it and resume the feeding of lids from outside the enclosure to the magazine 4. It will be noted that the cam disk 50 has high and low portions, each of which extends through a few degrees less than 180° of arc. Between these two semi-circular areas there are slopes on which the cam followers roll in moving from the high area to the low area and vice-versa. It is conceivable that upper limit switch 85 might release the clutch 45 just as the cam followers were on these inclines and the core of the air lock would then be in an intermediate position where there would be free flow of air between the interior and exterior of the enclosure. To avoid this there is a cam 90 on the vertical shaft 46 that operates a switch 91 on each rotation of the shaft, and this switch overrides the proximity switch 85 to keep the feeder operating just long enough to complete the travel of the core to one limit or the other of its oscillatory motion. Since shaft 46 rotates twice to each revolution of the cam 50, the cam and switch are so located that switch 91 will over-ride the proximity switch at just the time when the cam followers are on the sloped portions of cam 50. The circuitry is conventional and may be arranged in any one of several ways, and in FIG. 7 is merely a rough diagram to illustrate the general arrangement and relays or other equipment that would customarily be used are not shown. Signal current from line 92 is connected to proximity switches 85 and 86. Switch 85 is normally open and closes only when the level of lids in the magazine reaches the top limit. When switch 86 closes, it will energize coil 93 of a magnetic switch or relay to move the switch armature to a position where current will flow from line 94 through "clutch out" line 95 to disengage the clutch. When the lids from the magazine drop to a level where proximity switch 86 is closed, it will pass signal current through coil 93a to move the switch armature back to the full-line position to energize the "clutch in" line 96 and resume lid-feeding to magazine 4. There is a shunt circuit 97 that includes cam-operated switch 91 on shaft 46 so arranged that even if switch 86 opens, current will flow through the switch 91 and shunt circuit 97 to keep the "clutch in" until the cam 90 has rotated to a position where switch 91 is also open.

The invention provides a relatively simple and inexpensive mechanism for supplying lids to filled containers where the lids are applied and the containers sealed in an enclosure where the internal pressure is above or below atmospheric pressure. Where there is a pressure in the enclosure 2 above atmospheric pressure, a small amount of the air or other gas under pressure will enter each pocket in the oscillating air lock each time one of the pockets is moved to a position to drop a lid through the bottom slot in the casing 23, but since the top of the pocket at that time will be closed, there is no blow-through of the higher pressure gases in the enclosure to the atmosphere outside the enclosure. The large space within the enclosure relative to the small amount of air which is vented from one pocket and then the other is not of practical consequence and the simplicity of the pressure lock over more complicated devices compensates for the small loss of pressure gas resulting from its operation.

The semi-elliptical arrangement for the endless conveyor chain and lid guides enables the external magazine 12 to be convenient to the floor level on which the container feeding, filling, lid-sealing and discharge of sterilized filled containers is taking place so that replenishing this magazine with stacks of lids can be readily taken care of by the operator at a convenient level, while the lids are individually elevated to a height required for gravity discharge into and through the pressure lock and down the chute 35-39 into the lid-applying and seal machine magazine 4.

I claim:

1. In an apparatus wherein there is a mechanism within a pressure-sealed enclosure for applying and sealing lids to containers, the invention for transferring lids from the atmosphere to the machine in the enclosure comprising:
   a. a pressure lock outside the enclosure having a casing and a core rotatably fitted in the casing, the core having two pockets therein, one at each side of a central longitudinal plane, the casing having two longitudinally extending slots therethrough 180° apart, one at the top and one at the bottom with one at one side of a vertical longitudinal plane and one at the other, the arrangement being such that when either pocket in the core registers with the upper slot in the casing it is out of register with the lower slot in the casing and when either registers with the lower slot the casing is out of register with the upper slot in the casing, the pockets being so spaced that when one pocket in the body registers with one slot in the casing, the other pocket registers with the other slot,
   b. means for turning said core about its axis in the casing to alternately bring each pocket in the body into register with one slot in the casing and then the other,
   c. means for delivering a container lid to the upper slot in the casing in timed relation to the turning of the core body each time one of said pockets in the core registers with the top slot in the casing, and
   d. means enclosed against the ambient atmosphere sealed to the casing and passing through the enclosure wall for receiving each lid as it drops from a pocket in said core through the lower slot in the casing and arranged to deliver the lid so received to the lid-applying and sealing mechanism in the enclosure.

2. The invention defined in claim 1 wherein the pockets in said core extend through the core in such manner that a lid entering the pocket through the upper slot in the casing may drop out the slot in the lower side of the casing when the said pocket registers with the lower slot in the casing.

3. The invention defined in claim 2 wherein the said core-turning means effects an oscillatory movement of said core through an arc sufficient to bring one pocket and then the other into register first with the slot in the top of the casing and then with the slot in the bottom of the casing.

4. The invention defined in claim 3 wherein said means for oscillating the core comprises a cam having a high side and a low side and a cam follower operatively connected with said core for transmitting motion from the follower to the core, and there is a means for rotating the cam in timed relation to the means for delivering container lids to the slot in the upper part of the casing.

5. The invention defined in claim 1 in which said means for delivering container lids comprises a lid guide terminating adjacent the slot in the top of the casing and an endless sprocket chain for moving lids in succession along said guide and which is driven synchronously with said body-turning means.

6. The invention defined in claim 5 wherein said lid guide has a portion which extends from an elevated position downwardly to the casing, and means along said downwardly extending portion of the guide arranged to frictionally retard the free movement of the lids in advance of the endless sprocket chain until the lid is engaged in the slot in the top of the casing.

7. The invention defined in claim 5 wherein there is a lid-holding and feeding magazine outside the enclosure arranged to deliver lids one at a time to said lid guide and lid-moving sprocket chain, said sprocket chain and lid-holding and feeding magazine and the said core turning mechanism all being geared to a common drive whereby they operate in isochronism.

8. The invention defined in claim 7 in which the mechanism in the enclosure for applying and sealing lids to the containers is provided with a lid-receiving and holding magazine and the said means which is sealed to the said casing for transferring lids from the lower slot in the casing comprises a gravity chute through which the lids are guided into said magazine.

9. The invention defined in claim 8 in which the common drive for the sprocket chain, the lid-holding and feeding magazine and the core turning means is operated by said mechanism for applying and sealing lids to containers.

10. The invention defined in claim 8 in which the common drive is controlled by the variation in level of the lids in the magazine of said mechanism for applying and sealing lids to the containers.

11. The invention defined in claim 10 wherein there is a cam-operated switch driven by said common drive arranged to prevent the stopping of the common drive when said core-turning means is intermediate either limit of travel of the core.

12. The invention defined in claim 8 wherein said common drive comprises a clutch, and switch means on the magazine of the mechanism for applying and sealing lids to the containers arranged to render said clutch operative to transmit power when the accumulation of lids in the magazine of the said mechanism drops below a predetermined level and to release said clutch when the level rises to a predetermined point.

13. The invention defined in claim 1 wherein the pressure lock is elevated above the container lid-applying and sealing mechanism and the means for receiving the lids and delivering them to said mechanism is a gravity chute and wherein said means for delivering container lids to the slot in the top of said casing comprises a lid-holding and feeding magazine located at a level below said pressure lock, there being a lid guide leading from the bottom of said magazine first laterally and then downwardly around a semi-circle and then upwardly to a second semi-circle reversed with respect to the first with a generally vertical terminal portion ending at the pressure lock and an endless sprocket chain cooperatively positioned to move lids in spaced succession from said magazine, along the lid guide and a common drive for the pressure lock, the sprocket chain and the lid-holding and feeding magazine.

* * * * *